V. A. FYNN.
ALTERNATE CURRENT MOTOR AND GENERATOR.
APPLICATION FILED DEC. 21, 1906.

946,504.

Patented Jan. 11, 1910.

WITNESSES
L. L. Mead.
W. H. Alexander.

INVENTOR
V. A. Fynn.
BY
Fowler & Huffman
ATTORNEYS

UNITED STATES PATENT OFFICE.

VALÈRE ALFRED FYNN, OF LONDON, ENGLAND.

ALTERNATE-CURRENT MOTOR AND GENERATOR.

946,504.  Specification of Letters Patent.  Patented Jan. 11, 1910.

Application filed December 21, 1906.  Serial No. 348,907.

*To all whom it may concern:*

Be it known that I, VALÈRE ALFRED FYNN, of 18 Blessington road, Blackheath, London, England, electrical engineer, have invented certain new and useful Improvements in Alternate-Current Motors and Generators, of which the following is a specification.

My invention relates to alternate current motors but I do not herein claim the invention as applied to other than polyphase commutator motors with a shunt characteristic, other features of the invention being set forth in certain divisional application filed by me March 6, 1909, Serial No. 481,764.

The object of my invention is to control the power factor of polyphase commutator motors with a shunt characteristic.

I achieve my object by impressing on the winding responsible for the motor field corresponding to each motor phase a resultant E. M. F. the components of which differ in phase. In this manner I am able to adjust the phase of the motor field with respect to the phase of the working E. M. F. and since the phase of the back E. M. F. along the working axis of a motor depends on the phase of the motor field I am also able to adjust the phase of this back E. M. F. with respect to that of the working E. M. F. thus controlling the power factor of the motor by influencing the phase relation between the working E. M. F. and the working current.

Figure 1:
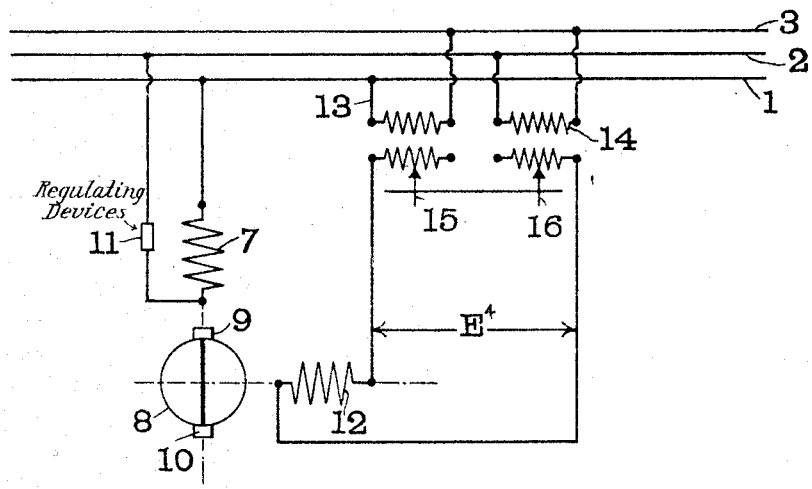
Figure 2:
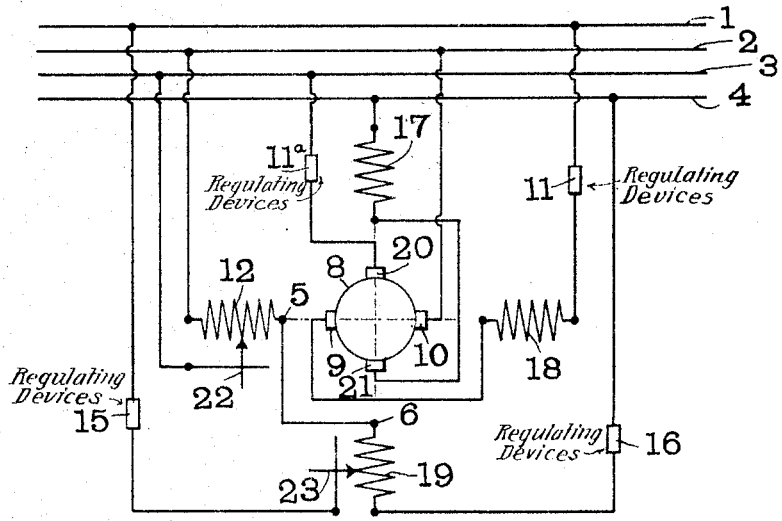

I will first describe my invention as applied to a single phase separately excited shunt induction motor shown in Figure 1 and afterward as applied to a neutralized and separately excited two-phase conduction motor as shown in Fig. 2 of the accompanying drawings.

Referring to Fig. 1, I derive the energy necessary for the operation of the motor from one of the phases, say 1, 2, to which I connect the main inducing winding 7 of the motor. This energy is inductively transmitted to the rotor 8 carrying a commuted winding short-circuited by the brushes 9, 10. The regulating device 11 included in the circuit 7 is any known and convenient device such as would be used in alternate current practice for the purpose of starting the motor or for regulating the same. I further impress on the field winding 12 disposed in the motor field axis, an E. M. F. $E^4$ partly derived from phase 1, 3, by means for instance of the transformer 13 and partly derived from phase 2, 3, by means for instance of the transformer 14. When the component E. M. F.'s derived from 13 and 14 which can be regulated at 15 and 16, are equal then $E^4$ is practically in quadrature with the E. M. F. impressed on 7 and capable of being regulated at 11. By adjusting the relative values of the two component E. M. F.'s impressed on 12 I alter the phase of the motor field relatively to the phase of the working E. M. F. and thus compensate the motor. By varying the magnitude of both components in the same proportion I vary the magnitude of the motor field and hence the speed of the motor without materially influencing the phase of said motor field.

In Fig. 2 the two phase mains are indicated at 1, 2, and 3, 4. Windings 17, 18 are neutralizing windings, whereas 12 and 19 are the field windings. The rotor 8 carries a commuted winding and brushes 9, 10 and 20, 21. The motor receives energy from phase 1, 2, by way of 11, the neutralizing winding 18 and the brushes 9, 10; it also receives energy from phase 3, 4 by way of $11^a$, the brushes 20, 21 and the neutralizing winding 17. In order to produce a torque with the current in 8 along 9, 10 and derived from 1, 2, I impress on 19 an E. M. F. derived from 3, 4 by way of 16 and 22. When 22 stands on point 5 of 12 then only the E. M. F. derived from 3, 4 is impressed on 19. In order to produce a torque with the current in 8 along 20, 21 and derived from 3, 4, I impress on 12 an E. M. F. derived from 1, 2, by way of 15 and 23. When 23 stands on point 6 of 19 then only the E. M. F. derived from 1, 2 is impressed on 12. Thus 12 and 19 may be regarded as the primaries of two independent transformers, the phase of the E. M. F. impressed on the one primary differing by about 90° from the phase of the E. M. F. impressed on the other. Now according to this invention I must impress at least two E. M. F.'s differing in phase on each of the motor field windings. I achieve this in the example shown in Fig. 2 by making use of the field windings themselves as transformed windings from which to derive a second E. M. F. for each of my field windings. For this purpose I displace 22 from point 5, thus impressing on 19 a second E. M. F. here derived from 12 and practically in phase quadrature with the E. M. F. already impressed on 19 and derived from 3, 4. For the same purpose I also displace 23 from point 6 thus impressing on 12 a second E. M. F. here derived from 19 and practically in phase quadrature with the E. M. F. already impressed on 12 and derived from 1, 2. I adjust the compensation of my motor by varying the relative magnitude of the two component E. M. F.'s impressed on each of the field windings and I vary the magnitude of the motor fields by varying in the same proportion both of the component E. M. F.'s impressed on each of the field windings.

Claims:

1. In a polyphase motor the combination with a revolving member adapted to carry current conductively impressed along as many axes as there are motor phases, said axes being stationary in space, of a stationary member carrying a neutralizing winding for each phase, each of said neutralizing windings being coaxially disposed with reference to one of the said stationary axes and connected in series relation with the revolving member along that axis, a field winding for each phase, the axis of said winding being displaced from that of the corresponding neutralizing winding and connections for impressing on each field winding at least two E. M. F.'s differing in phase.

2. In a polyphase motor the combination with a revolving member adapted to carry current conductively impressed along as many axes as there are motor phases, said axes being stationary in space, of a stationary member carrying a neutralizing winding for each phase, each of said neutralizing windings being coaxially disposed with reference to one of the said stationary axes and connected in series relation with the revolving member along that axis, a field winding for each phase the axis of each of said field windings being displaced from that of the corresponding neutralizing winding, connections for impressing on each field winding at least two E. M. F.'s differing in phase, and means for varying the relative magnitude of the E. M. F.'s impressed on each field winding.

3. In a polyphase motor the combination with a revolving member adapted to carry current conductively impressed along as many axes as there are motor phases, said axes being stationary in space, of a stationary member carrying a neutralizing winding for each phase, each of said neutralizing windings being coaxially disposed with one of said stationary axes and connected in series relation with the revolving member along that axis, a field winding for each phase displaced by 180/n degrees with respect to the corresponding neutralizing winding and connections for impressing on each field winding two E. M. F.'s differing in phase.

4. In a polyphase motor the combination with a revolving member, provided with a commuted winding, of a stationary member provided with a neutralizing winding and a field winding for each phase, each neutralizing winding being displaced from the corresponding field winding by 180/n degrees, means in series relation with each neutralizing winding for conveying a working current through the commuted winding along the axis of the corresponding neutralizing winding and connections for impressing on each field winding at least two E. M. F.'s differing in phase.

5. In a polyphase motor the combination with a revolving member provided with a commuted winding of a stationary member provided with a neutralizing winding and a field winding for each phase, each neutralizing winding being displaced from the corresponding field winding by 180/n degrees, means in series relation with each neutralizing winding for conveying a working current through the commuted winding along the axis of the corresponding neutralizing winding, connections for impressing on each field winding one E. M. F. derived from the mains and connections for impressing another E. M. F. differing in phase from the first and derived from another field winding.

In witness whereof, I have hereunto signed my name in the presence of two subscribing witnesses.

VALÈRE ALFRED FYNN.

Witnesses:
 GORDON MELVILLE CLARK,
 ROBERT MILTON SPEARPOINT.